United States Patent
Jacob et al.

(10) Patent No.: US 9,344,330 B2
(45) Date of Patent: *May 17, 2016

(54) HOME SENSOR DATA GATHERING FOR NEIGHBOR NOTIFICATION PURPOSES

(71) Applicant: STATE FARM MUTUAL AUTOMOBILE INSURANCE COMPANY, Bloomington, IL (US)

(72) Inventors: Michael Jacob, Le Roy, IL (US); Andrew Reeser, Heyworth, IL (US); Stacy L. Kennedy, Bloomington, IL (US); Lee C. Drinan, Bloomington, IL (US); Lisa Ann Frey, Normal, IL (US); Kevin Payne, Lexington, IL (US); Shawn M. Call, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,112

(22) Filed: Feb. 17, 2015

(65) Prior Publication Data

US 2015/0180708 A1    Jun. 25, 2015

Related U.S. Application Data

(63) Continuation of application No. 13/739,156, filed on Jan. 11, 2013.

(51) Int. Cl.
*G06F 15/16* (2006.01)
*H04L 12/24* (2006.01)
*H04W 4/08* (2009.01)
(Continued)

(52) U.S. Cl.
CPC ............ *H04L 41/0686* (2013.01); *G06F 9/542* (2013.01); *G08B 25/08* (2013.01); *H04L 12/2803* (2013.01); *H04L 12/2825* (2013.01); *H04L 41/0816* (2013.01); *H04L 41/16* (2013.01); *H04L 51/24* (2013.01); *H04L 67/02* (2013.01); *H04N 21/4882* (2013.01); *H04N 21/8126* (2013.01); *H04W 4/08* (2013.01); *H04L 67/12* (2013.01)

(58) Field of Classification Search
USPC ......................................................... 709/206
See application file for complete search history.

(56) References Cited

U.S. PATENT DOCUMENTS 6,977,585 B2    12/2005    Falk et al.
7,209,916 B1 *  4/2007    Seshadri et al.
(Continued)

OTHER PUBLICATIONS

Office Action issued in U.S. Appl. No. 13/739,156, dated May 13, 2013.
(Continued)

*Primary Examiner* — Richard G Keehn
(74) *Attorney, Agent, or Firm* — Marshall, Gerstein & Borun LLP; Randall G. Rueth

(57) ABSTRACT

In a computer-implemented method of generating event notifications, in-home data is received. The in-home data and environment data (e.g., weather, law enforcement, etc.) is generated by, or based on information generated by, a device located at a residence of an individual, and is analyzed to determine whether it is indicative of an event that should be reported to one or more neighboring residences and/or businesses. If the data is indicative of such an event, a notification is generated and transmitted to the relevant residences and/or businesses.

20 Claims, 4 Drawing Sheets

(51) Int. Cl.
  *H04N 21/488* (2011.01)
  *H04N 21/81* (2011.01)
  *G06F 9/54* (2006.01)
  *H04L 12/58* (2006.01)
  *G08B 25/08* (2006.01)
  *H04L 29/08* (2006.01)
  *H04L 12/28* (2006.01)

(56) References Cited

U.S. PATENT DOCUMENTS

| | | | |
|---|---|---|---|
| 7,539,532 B2 | 5/2009 | Tran | |
| 7,742,762 B1 | 6/2010 | Biere et al. | |
| 7,940,648 B1 * | 5/2011 | Suwala et al. | 370/218 |
| 8,106,769 B1 * | 1/2012 | Maroney et al. | 340/540 |
| 8,164,461 B2 | 4/2012 | Bischoff | |
| 8,400,299 B1 | 3/2013 | Maroney et al. | |
| 8,432,790 B2 | 4/2013 | Suwala et al. | |
| 8,516,087 B2 * | 8/2013 | Wilson et al. | 709/221 |
| 8,719,861 B2 | 5/2014 | McCarthy et al. | |
| 2003/0051026 A1 * | 3/2003 | Carter et al. | 709/224 |
| 2006/0033625 A1 | 2/2006 | Johnson et al. | |
| 2006/0286993 A1 * | 12/2006 | Xie et al. | 455/518 |
| 2007/0226616 A1 * | 9/2007 | Gagvani et al. | 715/700 |
| 2007/0283005 A1 * | 12/2007 | Beliles et al. | 709/224 |
| 2008/0092199 A1 * | 4/2008 | McCarthy et al. | 725/133 |
| 2008/0183902 A1 * | 7/2008 | Cooper et al. | 709/250 |
| 2009/0125460 A1 * | 5/2009 | Hewison et al. | 706/11 |
| 2009/0205015 A1 * | 8/2009 | Baliosian et al. | 726/1 |
| 2009/0243852 A1 * | 10/2009 | Haupt et al. | 340/541 |
| 2009/0316681 A1 * | 12/2009 | Hehmeyer et al. | 370/351 |
| 2009/0319482 A1 * | 12/2009 | Norlander et al. | 707/3 |
| 2010/0289644 A1 * | 11/2010 | Slavin et al. | 340/568.1 |
| 2011/0141880 A1 | 6/2011 | Suwala et al. | |
| 2012/0078410 A1 * | 3/2012 | Wong et al. | 700/110 |
| 2013/0191908 A1 * | 7/2013 | Klein | 726/18 |
| 2014/0201315 A1 | 7/2014 | Jacob et al. | |

OTHER PUBLICATIONS

Office Action issued in U.S. Appl. No. 13/739,156, dated Aug. 26, 2013.
Office Action issued in U.S. Appl. No. 13/739,156, dated Nov. 15, 2013.
Office Action issued in U.S. Appl. No. 13/739,156, dated Feb. 5, 2014.
Office Action issued in U.S. Appl. No. 13/739,156, dated Jul. 8, 2014.
Office Action issued in U.S. Appl. No. 13/739,156, dated Nov. 10, 2014.

* cited by examiner

HOME SENSOR DATA GATHERING FOR NEIGHBOR NOTIFICATION PURPOSES

CROSS-REFERENCE TO RELATED APPLICATIONS

This application is a continuation of and claims priority to U.S. application Ser. No. 13/739,156, filed on Jan. 11, 2013, entitled "Home Sensor Data Gathering for Neighbor Notification Purposes," the entire disclosure of which is hereby expressly incorporated by reference herein.

TECHNICAL FIELD

The present application relates generally to event notifications and, more specifically, to systems and methods for collecting and processing data for event sharing purposes.

BACKGROUND

In insurance industries, such as property/casualty, liability, life, and health insurance industries, insurance providers generally seek to minimize the risk of consumer loss. Often, threats to a given policy holder may potentially pose risks to others in the policy holder's neighborhood. For example, a criminal that burglarizes a policy holder's house may be likely to burglarize the policy holder's neighbors. Neighbors may also be prone to natural or other disasters affecting a policy holder's home (e.g., fires, water damage, hurricanes, tornados, etc.). While home automation systems generally detect threats at a given policy holder's home (e.g., through the use of burglar alarms, fire alarms, etc.), these automation systems fail to notify neighbors or other interested parties of the detected threats. Notifying neighbors of detected threats would allow them to take necessary precautions and to potentially aid the threatened consumer.

Unfortunately, policy holders do not currently have a way to integrate their home automation and security systems with other home management components and other home automation and security systems in their neighborhoods. This lack of integration compromises both policy holder safety and the safety of the policy holder's neighbors.

SUMMARY

Figure 1:
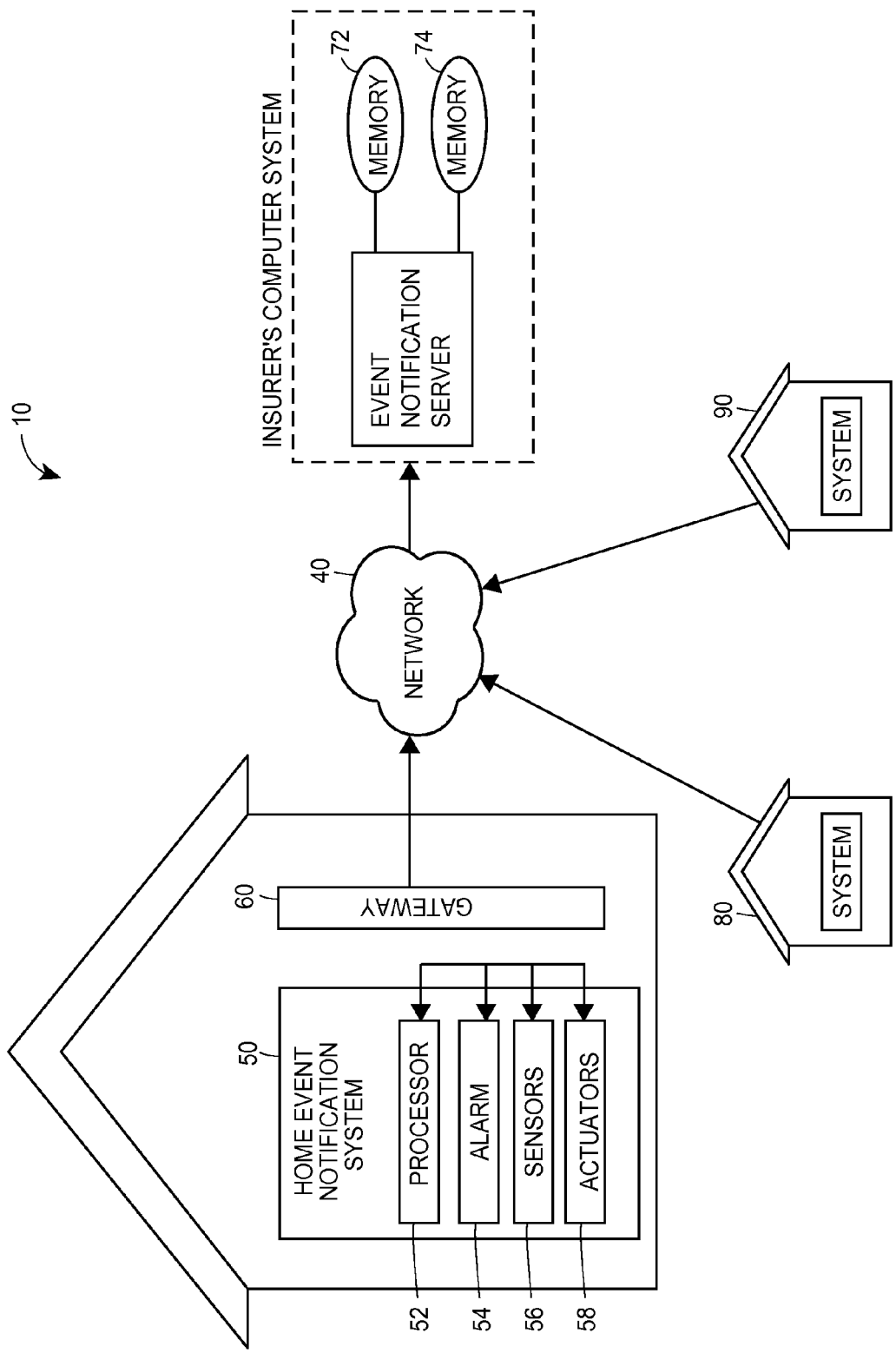
FIG. 1 is a block diagram of an example event notification system for providing notifications to neighboring residences and/or business about detected events.

A device for generating home or business-sourced notifications includes one or more processors and a memory unit coupled to the one or more processors. The memory unit stores executable instructions that when executed by the one or more processors cause the device to receive data listing one or more events that when detected by one or more sensors at a home or business trigger a notification report. The instructions also cause the device to receive data listing one or more remote devices to which the notification report will be transmitted, receive one or more notification rules describing the content of the notification report, and receive event data that is generated by, or based on information generated by, the one or more sensors. The event data is indicative of a condition monitored by the one or more sensors. Additionally, the instructions cause the device to determine whether the received event data corresponds to the one or more of the events which trigger the notification action, generate the notification report based on the received event data and the one or more notification rules, and transmit the notification report to the one or more other remote devices.

A tangible non-transitory computer-readable medium has instructions stored thereon that, when executed by a processor, cause the processor to receive data listing one or more events that when detected by one or more sensors at a home or business trigger a notification report. The processor then receives data listing one or more remote devices to which the notification report will be transmitted and receives one or more notification rules describing the content of the notification report. Additionally, the processor receives event data that is generated by, or based on information generated by, the one or more sensors, wherein the event data is indicative of a condition monitored by the one or more sensors. After receiving the event data, the processor determines whether the received event data corresponds to the one or more of the events which trigger the notification action. If so, the processor generates the notification report based on the received event data and the one or more notification rules and transmits the notification report to the one or more other remote devices.

A computer-implemented method of providing home or business-sourced data notifications includes receiving, at one or more computers, data listing one or more events that when detected by one or more sensors at a home or business trigger a notification report. The method also includes receiving, at one or more computers, data listing one or more remote devices to which the notification report will be transmitted and receiving, at one or more computers, one or more notification rules describing the content of the notification report. Additionally, the method includes receiving, at one or more computers, event data that is generated by, or based on information generated by, the one or more sensors. The event data is indicative of a condition monitored by the one or more sensors. After the event data is received, one or more computers determine whether the received event data corresponds to the one or more of the events which trigger the notification action. Then, one or more computers generate the notification report based on the received event data and the one or more notification rules. After this, one or more computers transmit at least a portion of the notification report to the one or more other remote devices.

DETAILED DESCRIPTION

FIG. 1 is a block diagram of an example event notification system for providing notifications to neighboring homes and/or business about detected events. The event notification system 10 includes a property 20 (e.g., a residence or business, a single-family home, townhome, condominium, apartment, storefront property, warehouse, etc.) of an insurance policy holder. The event notification system 10 also includes a remote computer system 30, generally located remotely from the residence 20 and associated with an insurance company, which receives information from one or more devices in the policy holder's residence 20 via a network 40. The remote computer system receives data about in-home events (e.g., break-ins, fires, natural disasters, etc.) and may generate and/or send notifications describing these events to one or other computer systems 80 and/or 90 (typically located at a remote home or business). In certain embodiments, computer systems 80 and 90 may also transmit data to home event notification system 50 or other event notification systems. The collected data from each of the computer systems may be aggregated and shared to keep each of the participating homes and/or businesses in a given area informed about events of interest. The network 40 may be a single network, or may include multiple networks of one or more types (e.g., a public switched telephone network (PSTN), a cellular telephone network, a wireless local area network (WLAN), the Internet, etc.).

In the embodiment shown in FIG. 1, the policy holder's property 20 includes a home event notification system 50 that includes a processor 52, an alarm 54, sensors 56, and actuators 58. The processor 52 accepts input from a human operator (e.g., from the policy holder) and controls the event notification processor 54, sensors 56, and actuators 58 accordingly. The operator may enter inputs to control the home event notification system 50 (e.g., setting events that will trigger the generation of a new notification when detected and setting notification rules) by using a touch screen, analog control panel, smartphone, tablet, or other web interface (not shown in FIG. 1) located at the residence 20, for example. Additionally or alternatively, the policy holder (or any other authorized system user) may control the home automation and monitoring system 50 by entering inputs in a smartphone, tablet, laptop computer, or other computing device, from either a remote location and/or while in the residence 20. The alarm 54 includes a device that generates an audio and/or visual alert when the processor 52 determines that certain programmed conditions have been satisfied, such as detecting motion with one or more of the sensors 56. Moreover, the processor 52 may support multiple notification modes, each of which corresponds to a different set of conditions for triggering the event notification processor 54. For example, a first, "at home" mode (i.e., intended for times when the user or a guest is at the residence 20) may cause the processor 52 to trigger the notification processor 54 only if a door or window is opened. Conversely, a second, "not at home" mode may likewise cause the processor 52 to trigger the notification processor 54 if a door or window is opened, but also if motion is detected within the home. To determine whether conditions such as these are satisfied, the sensors 56 may include motion detectors, door sensors, window sensors, and/or other devices, with each device of the sensors 56 providing sensor data to the processor 52 indicating whether the respective condition (motion, door or window in an open position, etc.) has been sensed. In some embodiments, the processor 52 also sends control information to some or all of the sensors 56, in order to activate or deactivate the sensors 56. When the notification processor 54 has been triggered, the processor 52 may cause an electronic message describing event notification data (e.g., the type of event that triggered the notification) to be sent to a remote computer associated, for example, with an insurance company and/or a neighboring home or business.

The processor 52 also controls the actuators 58. The actuators 58 include devices and/or sensors (e.g., devices including switches/relays, motors, valves, etc.) for controlling various devices within the residence 20, such as light fixtures, fans, televisions, appliances, outlets, door locks, water shutoff valves, and/or automated blinds, for example. A memory (not shown in FIG. 1) coupled to the processor 52 may store the current state of some or all of the actuators 58. The current states may be based on past control signals sent from the processor 52 to the actuators 58, or may be based on state information sent from actuators 58 to the processor 52, for example.

In the embodiment of FIG. 1, the processor 52 of the home event notification system 50 is coupled to the network 40 via a gateway 60. The gateway 60 may be a network interface (e.g., a network interface card, chip set, etc.) of a device that also includes the processor 52, for example. In some embodiments, gateway 60 may be omitted and devices may communicate directly with cloud-based infrastructures.

In other embodiments, different devices or systems are located at the residence 20, and/or the devices at the residence 20 are coupled to the network 40 in different ways than shown in FIG. 1. In one embodiment, for example, the home event notification system 50 includes more or fewer types of devices than are shown in FIG. 1. In an embodiment where the home event notification system 50 includes only home monitoring/security functionality, for example, the actuators 58 may not be included. Moreover, other devices, in addition to (or in place of) the event notification system 50, may be located at the residence 20 and send data to the remote computer system 30 via the network 40 and/or the gateway 60. Examples of such devices are discussed below in connection with FIG. 2.

Further, in some embodiments, the gateway 60 is coupled to the network 40 via one or more in-home networks (not shown in FIG. 1), such as a WLAN, and/or the residence 20 includes one or more gateways in addition to the gateway 60. For example, a home security system may be coupled to a PSTN via a PSTN interface, while a home automation system that controls non-alarm systems may be coupled to the Internet via a WLAN interface card and an in-home WLAN, where both the PSTN and the Internet are included within the network 40 as parallel paths to the insurer's computer system 30.

Still further, in some embodiments, some or all of the in-home data associated with the residence 20 is sent to the insurer's computer system 30 via a third party, rather than directly from the residence 20. For example, a server of a home security system provider (not shown in FIG. 1) may collect usage data relating to the processor 52, alarm 54, and/or sensors 56, and send that information (or other data based on that information) to the insurer's computer system 30 via the network 40 or a different network.

Referring again now to the embodiment shown in FIG. 1, an event notification server 70 within the remote computer system 30 receives event notification data from the processor 52 via the gateway 60 and network 40. The event notification server 70 may be a single server, or a plurality of servers with distributed processing. The event notification data may be indicative of any of various kinds of usage, and/or any of various kinds of monitored/sensed conditions, relating to the processor 52, alarm 54, sensors 56, and/or actuators 58. For example, the event notification data may indicate times at which the processor 52 sets the security system to be armed, times at which the alarm 54 is triggered, times at which any of the sensors 56 detect particular conditions (e.g., open doors, open windows, motion, etc.), times and/or modes of operation of the actuators 58 (e.g., times when various lights are turned on, intensity settings of lights, etc.), and/or any other information relating to the operation of the event notification system 50 at the residence 20.

The event notification server 70 may store the received in-home data in memory 72, where the in-home data may be accessed and/or retrieved at a later time for processing. The event notification server 70 may also be configured to retrieve notification data stored in memory 74. In some embodiments, the memory 72 and/or the memory 74 may be located outside of the remote computer system 30, may be accessible by the event notification server 70 via a network such as the network 40. The event notification data stored in the memory 74 may include data describing the types of notifications to be sent based on the received in-home data and/or rules for generating or transmitting these notifications. More specifically, the event notification data may describe one or more remote computers that should receive a notification based on the event that triggered the in-home data (e.g., to all homes within a given radius or to only a pre-specified subset of homes). The event notification server 70 may analyze the in-home data stored in memory 72 using some or all of the event notification data stored in memory 74 to determine how many notifications should be sent, where the notifications should be sent, and/or what type of information should be included in the notifications. For example, in an embodiment, the event notification server 70 may receive in-home data describing a detected event from event notification system 50 (e.g., in-home data describing the activation of a fire alarm). Based on the in-home data, the event notification server 70 may use the event notification data stored in memory 74 to determine whether a notification should be generated, and if so, what type of information should be included in the notification and/or what devices should receive the notifications. For example, in-home data describing activation of a fire alarm may trigger a high-priority notification that should be sent as soon as possible to every residence and/or business within a several block radius. Optionally, the event notification server 70 may use the notification data stored in memory 74 to determine that one or more notifications should be generated and/or transmitted not just to neighboring residences and/or business, but also to relevant authorities and/or other interested parties (e.g., the police department, the fire department, insurance companies, etc.). In certain implementations, preferences of users at the neighboring residences, businesses, and/or other parties may be examined when generating and/or transmitting the notifications. For example, one or more users may indicate that they want to opt out of receiving event notifications, in which case the generated notification may not be transmitted to their home or business.

While certain urgent events (e.g., the activation of a fire alarm) may trigger one or more high-priority notifications, other events may trigger lower-priority notifications that do not need to be transmitted as urgently or to as many other residences and/or businesses. For example, in an embodiment, a homeowner may indicate that while he is on vacation during the first week in December, he would like his neighbor to be notified if the temperature in the homeowner's residence falls below a certain level. If event notification server 70 receives in-home data indicating that the temperature of the homeowner's residence falls below this threshold level during the relevant time period, using the guidelines and/or rules set out by the event notification data stored in memory 74, the event notification server 70 may transmit a medium- or low-priority notification to the designated neighbor. As discussed above, in certain implementations, preferences of users at the neighboring residences, businesses, and/or other parties may be examined when generating and/or transmitting the notifications. In certain implementations, one more users may indicate that they want to opt out of receiving lower-priority event notifications, in which case, they still receive high priority notifications, but generated lower-priority notifications may not be transmitted to their home or business.

As described above, the event notification data stored in memory 74 may include data describing the types of notifications to be sent based on the received in-home data and/or rules for generating or transmitting these notifications. The event notification data stored in the memory 74 may be based on manually entered information, or may be "learned" by the event notification server 70 (or another server not shown in FIG. 1) based on the in-home data and event notification data of a plurality of other policy holders and/or based on data stored in an insurance company database. In certain embodiments, notifications may be based on manually submitted data or other data not generated by the in-home devices. For example, a notification may be based on data reported by a neighbor (e.g., regarding a potential break-in or fire condition) or by local weather data (e.g., data from the National Weather Service describing flooding threats or nearby forest fires).

Figure 2:
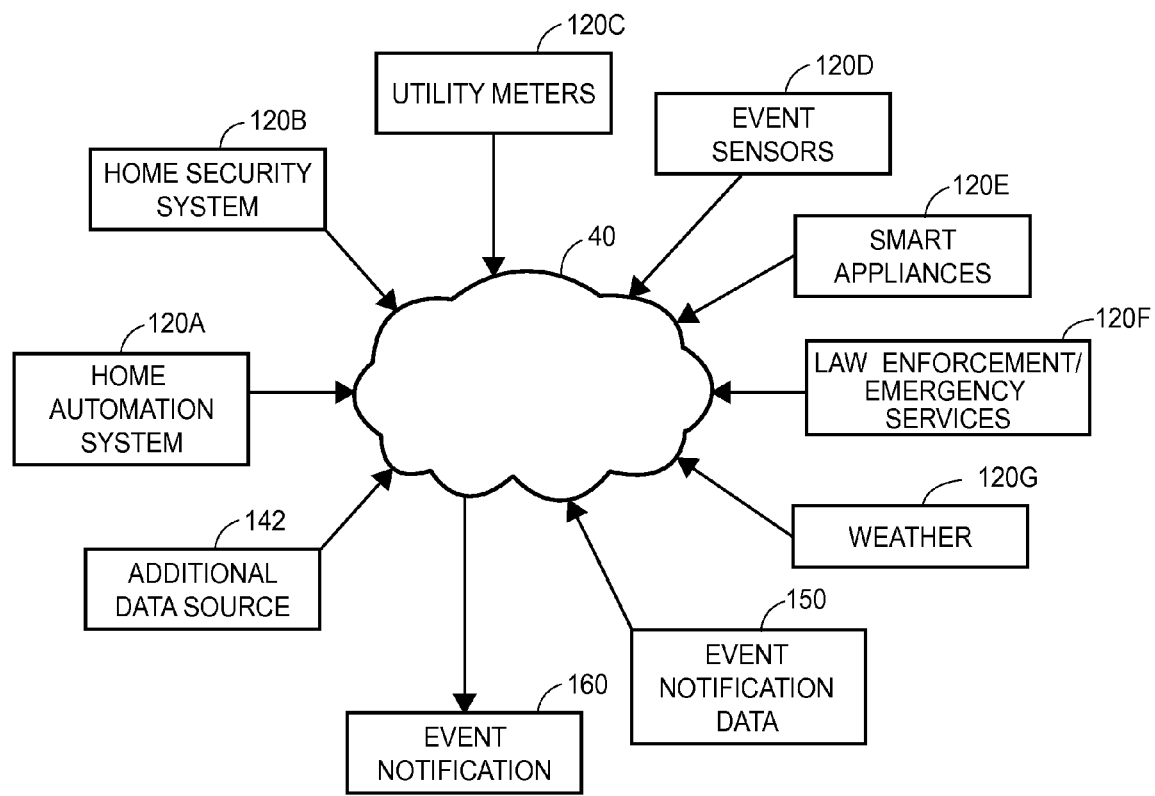
FIG. 2 is a block diagram of an example event notification system showing example in-home data sources which may be described in an event notification.

As noted above, information from various other types of in-home devices and systems may be utilized for event notification purposes. FIG. 2 is a block diagram of an example event notification system 100 showing a more extensive (but still non-exclusive) set of example in-home data sources 120A-120E and outside data sources 120F and 120G which may collect and/or transmit data that is described in a home event notification. In system 100 of FIG. 2, each of the data sources 120A-120G may provide data to an event notification server 70 over the network 40. The event notification server 70 also receives data from a notification data source 150. The event notification data source 150 may provide similar data to the event notification data stored on memory 74 of FIG. 1, for example. In the system 100 of FIG. 2, the event notification server 70 utilizes in-home data from one or more of the sources 120A-120E and outside data sources 120F and 120G, as well as other data regarding the policy holder or the policy holder's residence and notification preferences as well as model data from the event notification data source 150, to generate and/or transmit event notifications based on data detected and/or transmitted by the in-home data sources 120A-120E and outside data sources 120F and 120G. The event notifications described detected events at the home and/or business of a policy holder and may be transmitted to neighboring homes and/or businesses to alert neighbors of potential risks to their own property.

Each of the in-home data sources 120A-120E in FIG. 2 represents one or more devices at a residence or business of an insurance policy holder. For example, the home automation system data source 120A and home security system data source 120B may be components of a single system similar to the home automation and monitoring system 50 of FIG. 1, including the devices associated with the processor 52, alarm 54, sensors 56, and/or actuators 58. The utility meters data source 120C may include utility meter devices, such as a water meter that includes a water volume sensor, a gas meter that includes a gas sensor, an electricity meter that includes an electricity sensor, etc. The "event sensors" data source 120D may include any of various other types of sensor devices, such as fire or smoke detectors, carbon monoxide detectors, thermostats, water detectors or flow meters (e.g., to detect a water leak), door/window sensors, glass break sensors, temperature sensors, humidity sensors, door lock sensors, energy monitors, etc. In certain embodiments, data from different sources may be combined to determine whether an event has occurred. For example, data indicating that a power outage has occurred may be combined data indicating large amounts of rainfall to indicate that consumers may face a higher chance that their sump pumps aren't working and their homes or businesses might be experiencing water loss.

The smart appliances data source 120E may include smart appliance devices that generate information relating to their usage, such as a smart refrigerator that indicates the temperature settings and how often the water filter is changed, a smart washing machine that generates repair/maintenance codes, or a smart light bulb, for example. Still other types of data sources, not shown in FIG. 2, may also provide information to the event notification server 70. For example, a camera in the home of a policy holder may provide video data which the event notification server 70 may process in order to detect movement and/or other behaviors and/or conditions (e.g., detecting smoke in the field of view of the camera). Not all data sources need be located in the interior of a monitored property, or in a living quarters portion of a residential property. For example, a tilt sensor that indicates whether a garage door is open, and/or an outdoor movement sensor or camera mounted on an exterior wall of a home, may provide data to the event notification server 70. Further, not all data sources need be permanent fixtures of the residence. For example, the event sensors data 120D may include a smartphone with global positioning system (GPS) sensors that generate location data, which the event notification server 70 may use to determine whether the smartphone owner (e.g., the policy holder or a family member) is at home.

Outside data sources 120F and 120G in FIG. 2 represents one or more sources of data outside the a residence or business of an insurance policy holder that may still be relevant in the generation of event notifications. For example, the law enforcement/emergency services data source 120F and weather information data source 120G may be tied to outside data sources such as police departments, fire departments, and/or a local or national weather service. The law enforcement/emergency services data source 120F may report data from local or emergency services or other government agencies, such as, for example, data about local crime alerts, local fires, other relevant emergency information about events occurring in a policy holder's neighborhood. The "weather information data source 120G may report weather alerts from local or national weather services such as, for example, data about local flood warnings or events, storm warnings or events, hurricane warnings or events, tornado warnings/events, etc.

The event notification server 70 may operate directly on the data provided by data sources 120A-120G, or may operate on other data that is generated based on the data from data sources 120A-120G. For example, the event notification server 70 may process the data from data sources 120A-120G and convert it to a particular format (e.g., for efficient storage), and later utilize the modified data for event notification purposes.

In addition to receiving data from the data sources 120A-120G over the network 40, the event notification server 70 may use data stored in event notification data source 150 to generate event notifications. Among other things, this data may provide information about external factors regarding the residence associated with in-home data sources 120A-120E (e.g., a home address, a crime rate associated with a geographic area that includes the residence, or other environmental factors) and outside data sources 120F and 120G, and/or the policy holder associated with the residence (age, gender, etc.), that influence or may influence the risk of loss under a policy. Event notification data source 150 may also include data indicating policy holder preferences regarding the generation and/or transmission of event notifications. Event notification data source 150 may optionally receive data from an additional data source 142 coupled to or directly communicating with the event notification server 70. In other embodiments, the data source 142 is instead coupled to the network 40, and the event notification server 70 and event notification data source 150 receive data from the data source 142 via the network 40. In still other embodiments, the event notification system 100 does not include the data source 142 and information about external factors regarding the residence associated with in-home data sources may be programmed into event notification data source 150.

Based on the data received from the in-home data sources 120A-120E and outside data sources 120F and 120G and/or data stored in event notification data source 150, the event notification server 70 may generate and/or transmit a notification 160 describing one or more detected events at a policy holder's home and/or business (e.g., a detected fire, break-in, water loss, or any other relevant detected event). In certain embodiments, event notification server 70 transmits the notification to one or more of the policy holder's neighbors.

The event notification system 100 of FIG. 2 may generate event notifications in different ways according to numerous different embodiments and scenarios, using any of a wide variety of in-home data sources and any of a wide variety of correlation models. Some example embodiments are described here for illustration purposes. It is understood that the examples below are not exclusive. It is further understood that more than one notification embodiment may coexist within a single event notification system.

In one example embodiment, the home security system 120B or event sensors 120D include a water sensor detecting whether water has accumulated in the basement of a home, and the event notification data stored in the event notification data source 150 may include an event model under which a given level of water accumulation may indicate an event that causes water damage. The event notification server 70 may therefore use data from the water sensor to determine whether an event notification should be generated and optionally, to whom the notification should be transmitted.

In another example embodiment, the home security system 120B includes one or more power detection sensors, and event notification data source 150 stores an event model under which the power is for an abnormal length of time (or out during certain times of the day during which electricity is normally used) may indicate a power outage event. In certain embodiments, event notification data source 150 may include data about the type of residence being monitored in order to allow event notification server 70 to make a more accurate assessment. For example, a business may be typically use electricity during daytime hours than a summer home and the detection of any period of time during normal business hours in which the power is off may be indicative of a power outage, regardless of the length of time the power is out. Accordingly, event notification data source 150 may indicate that the monitored business property is under a power outage, to allow event notification server 70 to more accurately determine the extent of the power outage and what type, if any, of notification should be generated and/or transmitted.

In yet another example embodiment, the utility meters 120C include gas, water, and/or electricity meters that detect and indicate usage of the respective utilities, and the data stored in the event notification data source 150 may include a model in which a utility usage above a certain threshold (e.g., a determined average utility usage in the neighborhood of the policy holder's residence) may be indicative of an abnormal condition that should be reported to one or more neighbors (e.g., gas meter readings above a predetermined threshold may be an indication of a dangerous gas leak that every neighbor within a large radius should be aware of as soon as possible). Alternatively (or additionally), according to a model stored in the event notification data source 150, very low electricity usage, may be indicative of a power outage. While certain neighbors would likely be notified of the power outage, a power outage notification would likely not be as urgent as a notification of a gas leak and would likely be transmitted to fewer neighbors. Accordingly, based on the data received from utility meters 120 C and the model stored in event notification data source 150, event notification server 70 may determine whether a power outage has occurred and what type, if any, of notification should be generated and/or transmitted.

While in certain embodiments, such as those described above, one of sources 120A-120G generates data which can then be interpreted by event notification server 70 to determine that an abnormal event has been detected (e.g., event notification server 70 may determine that a break-in has occurred based on a door or window being left open for a seemingly abnormal period of time), in other embodiments, one of sources 120A-120E may generate one or more alarm signals which may directly reflect an abnormal event. For example, in an embodiment, a fire alarm included in event sensors 120D may be triggered if the fire alarm detects smoke at a monitored home or residence. Instead of sending data which may need to be analyzed to determine what type of, if any, event has occurred and what type of notification may need to be generated, in this embodiment, event sensors 120D may directly indicate that a fire has been detected and a high priority notification should be generated and transmitted to relevant neighbors.

Figure 3:
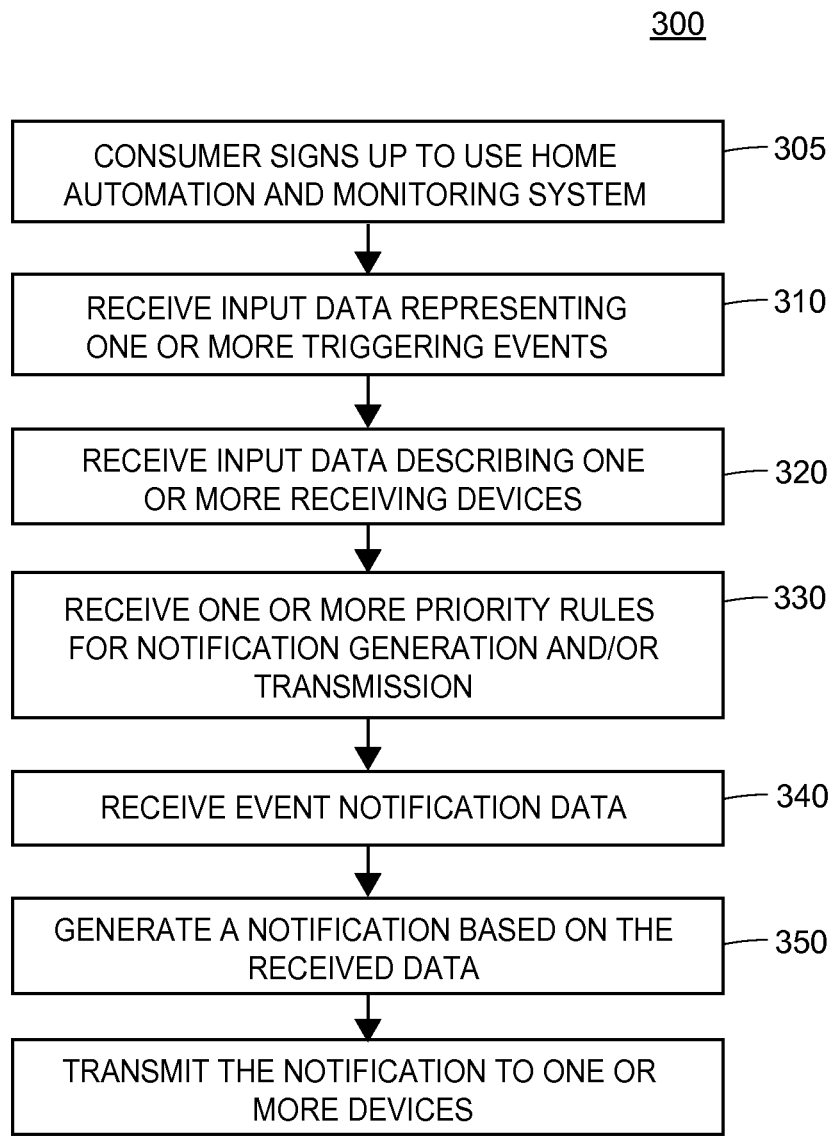
FIG. 3 is a flow diagram of an example method for providing notifications to neighboring homes and/or business about detected events.

FIG. 3 is a flow diagram of an example method 300 for generating in-home event notifications. The method 300 may be implemented by one or more computers, such as those shown in system 10 of FIG. 1, or system 100 of FIG. 2, for example. Optionally, some or all of home automation and monitoring system 50 and event notification server 70 may be executed on a processor associated with a mobile device or on a processor associated with a server device, or may be executed partially on a processor associated with a client device and partially on a processor associated with a server device. For example, Processor 52 of Home Automation and Monitoring system 50 may execute in a processor of a client device or another computing device to accept input from a human operator (e.g., from an insurance policy holder) and control the event notification processor 54, sensors 56, and actuators 58 accordingly. Processor 52 may also execute in the processor of a server device, receiving inputs and/or transmitting control signals, in whole or in part, to a client or another computing device. Similarly, event notification servers 70 may include one or more processors operating on one or more computing devices.

The method 300 begins at optional block 305, when a consumer signs up to use home automation and monitoring system 50. At block 305, the consumer may, for example, indicate what types of alerts they would like to generate and/or receive. After this, home automation and monitoring system 50 receives input data (e.g., from a policy holder) representing one or more events occurring at a monitored property (e.g., the policy holder's residence of business) that triggers a notification action (block 310). The property may, for example, be a single-family home, townhome, condominium, apartment, storefront, or retail space, and the input data may be entered, for example, by a current insurance policy holder. More specifically, the input data may indicate various events or detected conditions that the insurance policy holder would like to be reported to one or more of his neighbors. For example, a policy holder may wish to notify his neighbors if a fire is detected at his house, water loss has occurred, and/or the garage door has been left open for a designated time period. In this embodiment, at block 310, home automation and monitoring system 50 receives data from the policy holder indicating that the detection of one or more of these events should trigger the generation of an event notification. Home automation and monitoring system 50 may optionally store this data and/or transmit this data to a remote device such as event notification server 70.

In method 300, home automation and monitoring system 50 also receives input data describing one or more remote devices to act as recipients of the notification action (block 320). The remote devices may, for example, be one or more client devices, servers, smartphones, or other computing devices associated with a policy holder's neighbors (both residential properties and businesses) and/or the policy holder's insurance company. More specifically, at block 320, the policy holder may input a list of the residential properties and/or businesses that should receive the event notifications after they are generated. Further, the policy holder may have the option of customizing different recipients for different notifications. For example, if a fire is detected at his house, the policy holder may wish to contact every home and/or business within a large geographical radius. The policy holder may also wish to contact emergency services (e.g., the fire department) and/or his insurance company. Optionally, home automation and monitoring system 50 may confirm that each of the parties the policy holder wishes to notify has a device (e.g., a client, server, smartphone, personal computer, etc.) configured to receive event detection notifications. After the policy holder inputs the list of notification recipients, home automation and monitoring system 50 may then receive and/or store this data. Again, home automation and monitoring system 50 may also optionally transmit this data to a remote device such as event notification server 70.

The method 300 also includes receiving one or more priority rules for the transmission/and or generation of the event notification (block 330). More specifically, at block 330, home automation and monitoring system 50 receives one or more rules describing specific notifications that the recipients listed at block 320 should receive and what type of priority the notifications should be sent with. That is, notifications describing certain types of events may be transmitted urgently, with a high-priority, to most or all of the devices specified at block 320, while other notifications may be able to tolerate a longer transmission delay and only be sent to a few or a single party. The received priority rules may describe these conditions. For example, at block 330, a user may specify that if a fire is detected, a notification should be generated as quickly as possible and transmitted to every home and/or business within a large radius. On the other hand, if an opened garage door has been detected, the policy holder may indicate that only his next-door neighbor should be notified, and that the notification does not have to be sent as urgently. After the policy holder inputs the list of notification rules, home automation and monitoring system 50 may then receive and/or store this data and may also optionally transmit this data to a remote device such as event notification server 70.

After the notification conditions and rules described above have been received and an event has been detected, a device such as, for example, event notification server 70 receives event notification data that is generated by or based on information generated by one or more of the devices and or systems monitoring the policy holder's property (block 340). In certain embodiments, instead of transmitting event notification data to event notification server 70, home automation and monitoring system 50 may communicate directly with devices at or associated with neighboring homes or residences. In these embodiments, some or all of the notification generation and/or transmission steps described herein may be performed at these devices. As described above, the event notification data may be indicative of any of various kinds of usage, and/or any of various kinds of monitored/sensed conditions, relating to the processor 52, alarm 54, sensors 56, and/or actuators 58. In certain embodiments, event notification server 70 receives event notification data that is not necessarily indicative of an event that should be reported and may require further processing to determine whether a notification should be generated (e.g., data indicating that the garage door has been open for over an hour, which may or may not be indicative of a break-in). In other embodiments, event notification server 70 receives event notification data that directly indicates that an event should be reported (e.g., data indicating that a smoke alarm has detected a fire at the policy holder's property and explicitly stating that a notification should be generated and transmitted).

If necessary, after receiving the event notification data described above, event notification server 70 determines whether to generate an event notification. When an event notification is necessary, event notification server 70 then generates the notification to transmit to one or more other devices (block 350). More specifically, event notification server 70 may interact with data and models stored in memory 74 to generate a notification containing relevant information (e.g., the type of event detected, the location of the detected event, and/or the name of the monitored property's owner) can be transmitted to the neighboring residences and/or businesses. For example, in an embodiment, event notification server 70 may receive data at 11 pm indicating that at the front door of a policy holder's residence has been open for over 30 minutes. Based on the received data, event notification server 70 may reference data stored in memory 74 (e.g., modeling data showing that after a certain hour, a door or window that is open for a given period of time is almost certain indicative of a break-in) to determine that this data is likely indicative of a home break-in. Event notification server 70 may also reference stored data indicating policy holder preferences when generating an event notification. For example, using the received data, event notification server 70 may determine the name and contact information for the policy owner whose property is being monitored and cross-reference this information with user preferences stored in memory 74. In an embodiment, the policy holder may specify that in the event of a detected break-in, he would only like to send notifications to two of his next door neighbors. For other detected events, the policy holder may specify that he would like to notify different parties (e.g., a different set of neighbors, all residents and businesses within a given radius, local emergency crews, the insurance company, etc.). In addition to storing data describing which parties should be notified when an event is detected, memory 74 may also store other user preferences (e.g., whether the policy holder wishes to remain anonymous when other parties are notified, what types of devices the notifications should be sent to, etc.). After generating an event notification as described above, the event notification server 70 may optionally send the generated event notification to one or more specified third parties (e.g., neighboring residences, businesses, authorities, the insurance company, etc.) (block 360). Optionally, event notification server may confirm that the policy holder wishes to transmit a notification before it is actually transmitted. That is, the policy holder may receive a message indicating that a notification is about to be transmitted to one or more neighbors, and asking him to confirm that he wants to transmit the notification before it is actually transmitted in block 360.

Figure 4:
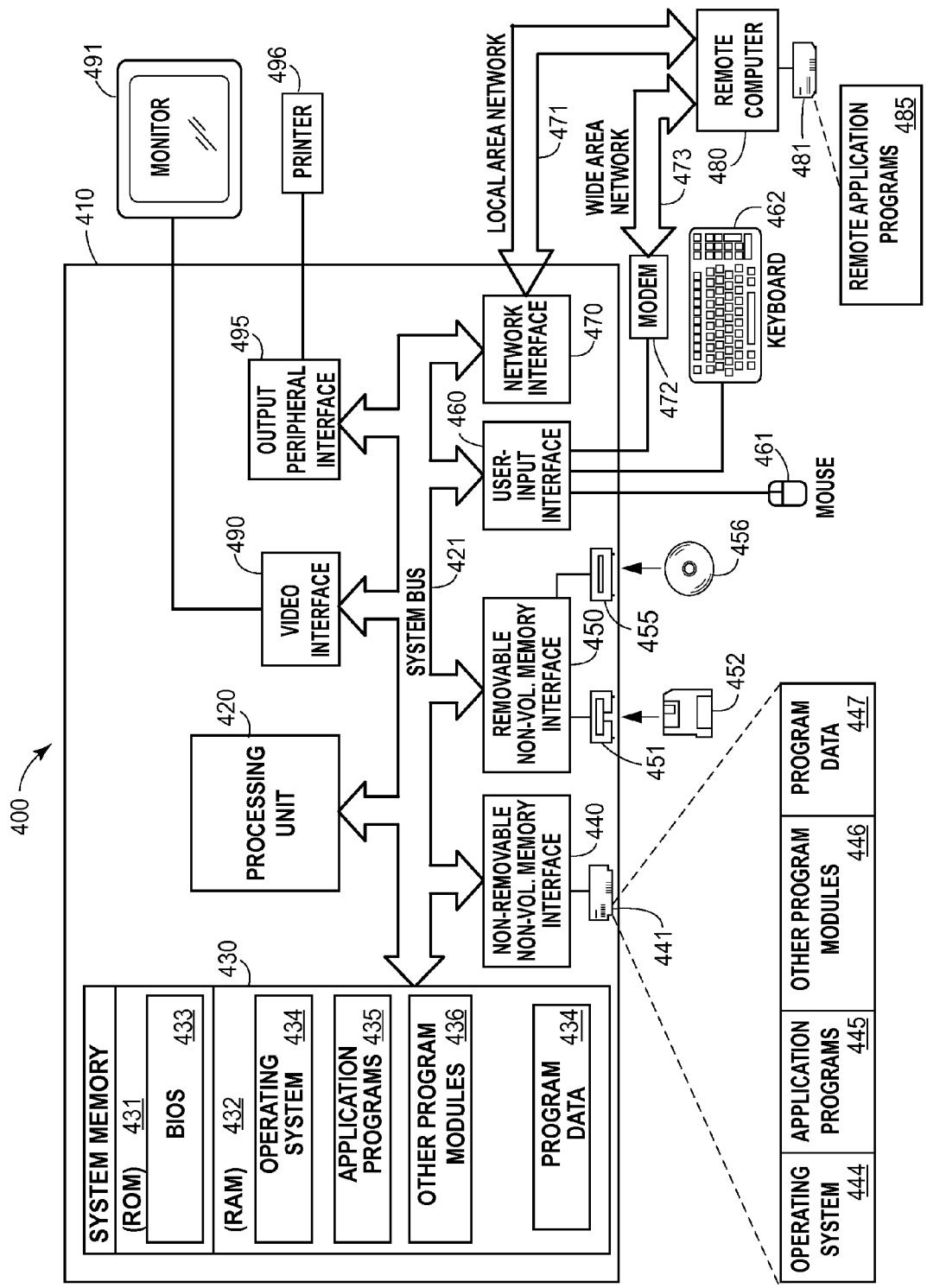
FIG. 4 illustrates a block diagram of an example computer system on which an example method for providing notifications to neighboring homes and/or business about detected events may operate in accordance with the described embodiments.

FIG. 4 illustrates a block diagram of an example computer system 400 on which an example method for generating event notifications may operate in accordance with the described embodiments. The computer system 400 of FIG. 4 includes a computing device in the form of computer 410. Although computer 410 in system 400 is depicted as a single device, in certain embodiments, computer 410 may include multiple computing devices. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and nonvolatile media, and both removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer readable media.

The system memory 430 includes computer storage media in the form of volatile and/or nonvolatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 540, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer 510. In FIG. 4, for example, hard disk drive 441 is illustrated as storing operating system 444, application programs 445, other program modules 546, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and cursor control device 461, commonly referred to as a mouse, trackball or touch pad. A monitor 491 or other type of display device is also connected to the system bus 421 via an interface, such as a graphics controller 490. In addition to the monitor, computers may also include other peripheral output devices such as printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in hospitals, offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the input interface 460, or other appropriate mechanism. In a networked environment, program modules depicted relative to the computer 410, or portions thereof, may be stored in the remote memory storage device 481. By way of example, and not limitation, FIG. 4 illustrates remote application programs 485 as residing on memory device 481.

The communications connections 470 and 472 allow the device to communicate with other devices. The communications connections 470 and 472 are an example of communication media, as discussed above.

The methods of the event notification embodiments described above may be implemented in part or in their entirety using one or more computer systems such as the computer system 400 illustrated in FIG. 4. For example, in-home data, event data, and/or event notification data may be received by a computer such as the computer 410 or remote computer 480. As another example, event description and/or notification data may be received from a removable memory source such as the nonvolatile magnetic disk 452 or the nonvolatile optical disk 456. As another example, user inputs and settings may be received as a result of a human entering data through an input device such as the keyboard 462.

Some or all calculations performed in the event notification system embodiments described above (e.g., calculations for determining an in-home data pattern, calculations for determining an insurance premium adjustment, etc.) may be performed by a computer such as the computer 410, and more specifically may be performed by a processor such as the processing unit 420, for example. In some embodiments, some calculations may be performed by a first computer such as the computer 410 while other calculations may be performed by one or more other computers such as the remote computer 480. The calculations may be performed according to instructions that are part of a program such as the application programs 435, the application programs 445 and/or the remote application programs 485, for example.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automated claim assessment through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method of providing event-driven notifications, the method comprising:
   obtaining, at one or more computers, data listing one or more events that, when detected by one or more sensors at a first real property, trigger a notification report;
   obtaining, at one or more computers, data listing one or more remote devices that are associated with at least a second real property, and to which the notification report will be transmitted;
   obtaining, at one or more computers, one or more notification rules describing content of the notification report and conditions for transmitting the notification report, wherein the one or more computers autonomously learns at least one of the notification rules by generating an event model used to identify the conditions for transmitting the notification report based on property event data that is generated by one or more third real properties, wherein each of the first, second, and third real properties are different;
   receiving, at one or more computers, event data that is generated by, or based on information generated by, the one or more sensors, wherein the event data is indicative of a condition monitored by the one or more sensors;
   determining, at one or more computers, whether the received event data corresponds to the one or more of the events which trigger the notification report;
   generating, at one or more computers, the notification report based on the received event data and the one or more notification rules; and
   transmitting, using one or more computers, at least a portion of the notification report to the one or more remote devices associated with at least the second real property.

2. The method of claim 1, further comprising: transmitting, using one or more computers, at least a portion of the notification report to one or more local authorities.

3. The method of claim 1, wherein the received event data is indicative of at least one of a fire, water loss, weather event, or open entry event.

4. The method of claim 1, wherein transmitting at least a portion of the notification report comprises transmitting data indicative of user settings of one or both of (i) a security system located at the first real property, or (ii) an automation system located at the first real property.

5. The method of claim 1, wherein obtaining one or more notification rules comprises obtaining one or more notification rules based on a type of event triggering the notification report.

6. The method of claim 5, wherein obtaining one or more notification rules based on the type of event triggering the notification report comprises providing a subset of remote devices from a larger set of remote devices to act as recipients of the notification report.

7. The method of claim 5, wherein each of the one more notification rules includes a priority level based on one of the events which triggers the notification report, and wherein the notification report is transmitted on a time delay based on the priority level that corresponds to the received event data.

8. A non-transitory computer-readable storage medium coupled to one or more processors of a system and comprising computer-readable instructions for providing event-driven data notifications, the instructions, when executed the by one or more processors, cause the system to:
   obtain data listing one or more events that when detected by one or more sensors at a first real property, trigger a notification report;
   obtain data listing one or more remote devices that are associated with at least a second real property, and to which the notification report will be transmitted;
   obtain one or more notification rules describing content of the notification report and conditions for transmitting the notification report, wherein the one or more processors autonomously learns at least one of the notification rules by generating an event model used to identify the conditions for transmitting the notification report based on property event data that is generated by one or more third real properties, wherein each of the first, second, and third real properties are different;
   receive event data that is generated by, or based on information generated by, the one or more sensors, wherein the event data is indicative of a condition monitored by the one or more sensors;
   determine whether the received event data corresponds to the one or more of the events which trigger the notification report;
   generate the notification report based on the received event data and the one or more notification rules; and
   transmit at least a portion of the notification report to the one or more remote devices associated with at least the second real property.

9. The computer-readable storage medium of claim 8, wherein the instructions further cause the system to transmit at least a portion of the notification report to one or more local authorities.

10. The computer-readable storage medium of claim 8, wherein the received event data is indicative of at least one of a fire, water loss, weather event, or open entry event.

11. The computer-readable storage medium of claim 8, wherein the instructions to transmit at least a portion of the notification report comprise instructions to transmit data indicative of user settings of one or both of (i) a security system located at the first real property, or (ii) an automation system located at the first real property.

12. The computer-readable storage medium of claim 8, wherein the instructions to obtain one or more notification rules comprise instructions to obtain one or more notification rules based on a type of event triggering the notification report.

13. The computer-readable storage medium of claim 12, wherein the instructions to obtain one or more notification rules based on the type of event triggering the notification comprise instructions to obtain a subset of remote devices from a larger set of remote devices to act as recipients of the notification report.

14. The computer-readable storage medium of claim 12, wherein each of the one more notification rules includes a priority level based on one of the events which triggers the notification report, and wherein the notification report is transmitted on a time delay based on the priority level that corresponds to the received event data.

15. A device operative to provide event-driven notifications, the device comprising:
one or more processors;
a memory unit coupled to the one or more processors and storing executable instructions that when executed by the one or more processors cause the device to:
obtain data listing one or more events that when detected by one or more sensors at a first real property trigger a notification report;
obtain data listing one or more remote devices, associated with at least a second real property, to which the notification report will be transmitted;
obtain one or more notification rules describing content of the notification report and conditions for transmitting the notification report, wherein the one or more processors autonomously learns at least one of the notification rules by generating an event model used to identify the conditions for transmitting the notification report based on property event data that is generated by one or more third real properties, wherein each of the first, second, and third real properties are different;
receive event data that is generated by, or based on information generated by, the one or more sensors, wherein the event data is indicative of a condition monitored by the one or more sensors;
determine whether the received event data corresponds to the one or more of the events which trigger the notification report;
generate the notification report based on the received event data and the one or more notification rules; and
transmit at least a portion of the notification report to the one or more remote devices associated with at least the second real property.

16. The device of claim 15, wherein the instructions further cause the device to transmit at least a portion of the notification report to one or more local authorities.

17. The device of claim 15, wherein the received event data is indicative of at least one of a fire, water loss, weather event, or open entry event.

18. The device of claim 15, wherein the notification report comprises data indicative of user settings of one or both of (i) a security system located at the first real property, or (ii) an automation system located at the first real property.

19. The device of claim 15, wherein the instructions further cause the device to transmit at least a portion of the notification report to one or more remote devices associated with at least the second real property, wherein the second real property neighbors the first real property.

20. The device of claim 15, wherein the device is operated by an insurance company.

* * * * *